Jan. 5, 1965 H. W. WESTEREN ETAL 3,164,452
METHOD AND APPARATUS FOR DRYING A GASEOUS MEDIUM
Filed May 29, 1961 2 Sheets-Sheet 1

INVENTORS.
Herbert W. Westeren
Andrew J. Syska
BY
Salter + Michaelson
Attorneys.

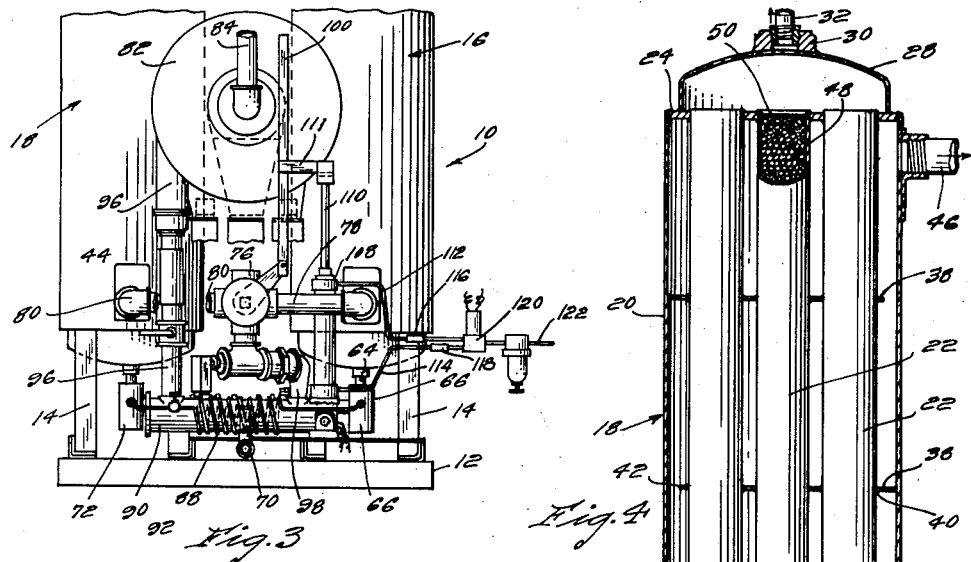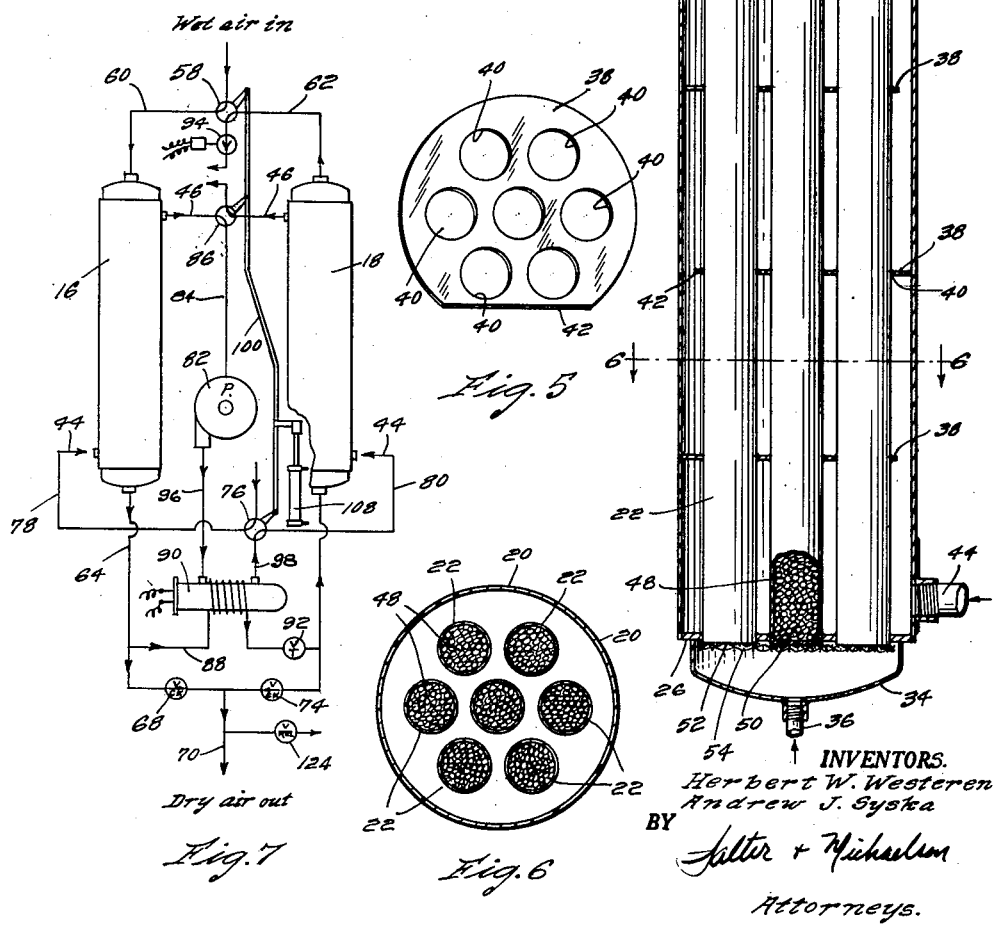

United States Patent Office 3,164,452
Patented Jan. 5, 1965

3,164,452
METHOD AND APPARATUS FOR DRYING A GASEOUS MEDIUM
Herbert W. Westeren, Barrington, and Andrew J. Syska, Cranston, R.I., assignors to C. I. Hayes, Inc., Cranston, R.I., a corporation of Rhode Island
Filed May 29, 1961, Ser. No. 120,846
8 Claims. (Cl. 55—33)

The present invention relates to apparatus for drying a fluid, by the use of a drying agent. More particularly, the present invention relates to desiccant drying apparatus that is adapted to remove moisture from an operating medium, and simultaneously regenerate similar apparatus that is used interchangeably and alternately with the apparatus for processing the operating medium.

The drying apparatus embodied herein utilizes a desiccant type drying agent in the form of a plurality of small pellets that are disposed in packed beds. One of the problems experienced heretofore in drying apparatus of this type was the efficient regeneration of the drying agent after saturation thereof during the drying cycle. Normally, regeneration is carried out by heating the drying agent for removing the moisture therefrom and then cooling the drying agent so that the apparatus in which it is located may be used once again for the drying operation. Prior to the instant invention various techniques have been employed for heating the drying agent during the regeneration period, one example of which is the insertion of a heating element directly in the packed bed of desiccant material. Although this heating method served the purpose of introducing the heat into the drying necessary to withdraw moisture therefrom, the packed bed had a tendency to retain the heat therein, thereby lengthening the cooling cycle.

In the invention embodied herein, a plurality of individual tubes containing a drying agent are utilized and are vertically arranged in spaced relation in a vertical work chamber or cylinder and not only increase flow rate characteristics during the drying cycle but further act to reduce the regeneration cycle by enabling the drying agent located therein to be rapidly cooled. The period for the heating and cooling cycles during regeneration are further reduced by the use of the tubes since separately introduced gas into the work chamber may be heated as desired during the regeneration period.

The heated gas used during the regeneration of the desiccant is withdrawn from the processing chamber and is heated prior to the introduction thereof into the chamber being regenerated, which technique greatly increases the efficiency of the heating cycle. Regeneration is further aided by withdrawing a portion of the dried operating medium from the gas stream and heating it and then using the heated dried gas to purge the desiccant being reactivated. During the regeneration period the heated gas and purge gas are separated into two separate flow systems, the isolation thereof providing for the efficient heating and cooling of the desiccant. The present invention further includes a novel step of introducing ambient air into the chamber processing the operating medium so as to cool the desiccant or drying agent located in the tubes while it is adsorbing so as to obtain near isothermal conditions of the system.

It is therefore an object of the present invention to provide a dryer for removing moisture from a gaseous medium having low equipment and operating costs and excellent drying qualities.

Still another object is to provide a dryer having a vertically positioned operating chamber wherein flow therethrough is in a downwardly direction thereby eliminating the flow rate limitations normally associated with the prior known equipment having upflow therethrough.

Still another object is to provide drying apparatus for a fluid that is regenerated by utilizing isolated gas streams, the separate gas streams providing for efficient heat exchange during the regeneration period.

Still another object is to teach a method of simultaneously drying a fluid and regenerating an operating cylinder, wherein the step of regenerating is efficiently carried out by utilizing isolated gas streams in the operating cylinder.

Still another object is to teach a method of simultaneously drying a fluid and regenerating an operating cylinder wherein a portion of the dried fluid is utilized as a purge gas for regeneration, while a heated gas withdrawn from the cylinder drying the fluid is utilized as the regenerating medium.

Still another object is to provide a desiccant-type of drying apparatus for use in the drying of compressed air wherein heat is indirectly withdrawn from the desiccant to increase the efficiency of the drying operation.

Still another object is to provide a system for use in the drying of a gaseous medium wherein two substantially similar drying chambers are located in parallel, one of the drying chambers being utilized in the air drying operation while the other drying chamber is simultaneously regenerated.

Still another object is to provide drying apparatus that includes parallel drying chambers and means for automatically reversing the gas flow from the chamber used for drying so that it is directed into the other chamber wherein a reconditioning operation of the processing chamber is started simultaneously with the beginning of the drying cycle in the other chamber.

Other objects, features and advantages of the invention will become apparent as the description thereof proceeds when considered in connection with the accompanying illustrative drawings.

In the drawings which illustrate the best mode presently contemplated for carrying out the present invention:

FIG. 3 is a rear elevational view of the lower portion of the drying apparatus illustrated in FIGS. 1 and 2;

FIG. 4 is a vertical sectional view of one of the drying chambers illustrated in FIG. 1;

FIG. 5 is a perspective view of one of the locating discs that is positioned in each of the drying chambers;

FIG. 6 is a sectional view taken along lines 6—6 in FIG. 4; and

FIG. 7 is a diagrammatic illustration of the apparatus embodied herein showing the direction of flow of the gases through the drying chambers.

In the description of the invention following hereinafter, the apparatus is described for use in the drying of or the removal of moisture from any fluid, one example of which is instrument air such as would normally be utilized for various types of instruments and in jet engine starters.

Figure 1:
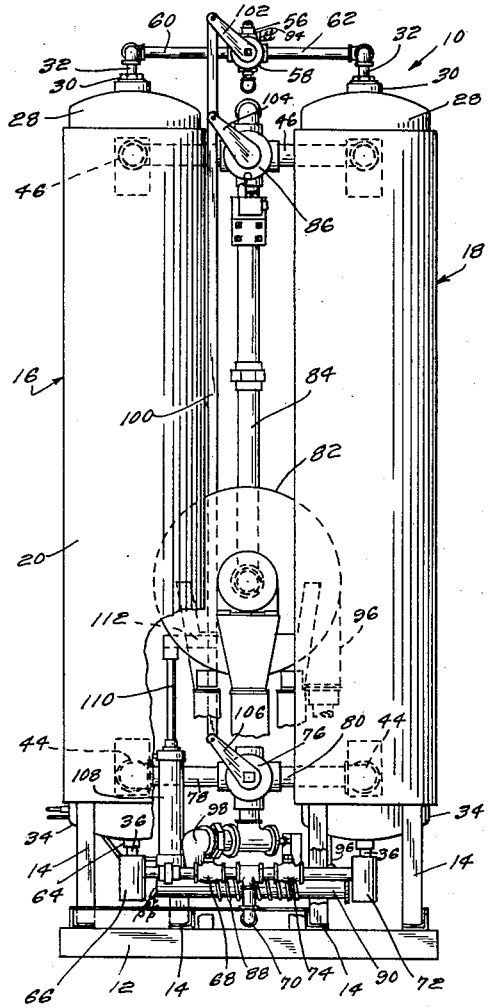
FIG. 1 is a front elevational view of the drying apparatus embodied in the present invention.
Figure 2:
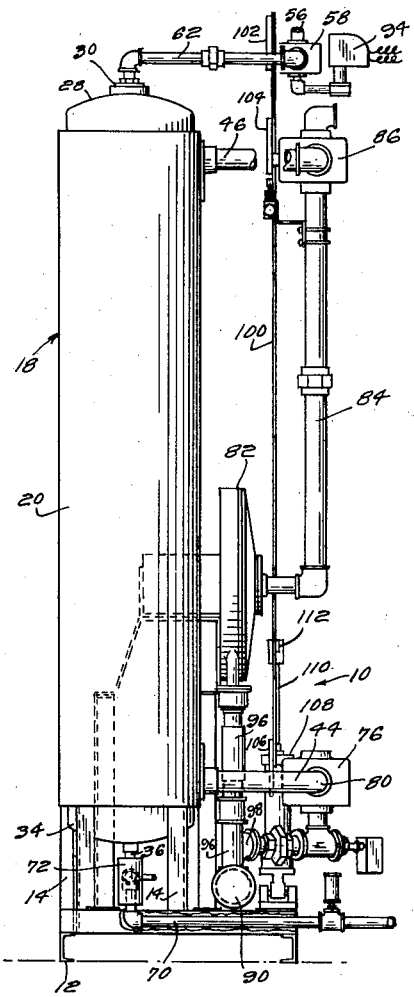
FIG. 2 is a side elevational view of the drying apparatus.

Referring now to the drawings and particularly to FIGS. 1, 2 and 3, the drying apparatus embodied herein is generally indicated at 10 and includes a base 12 having vertical standards 14 secured thereto. Secured to the vertical standards 14 are a pair of elongated cylindrical drying chambers 16 and 18, the axes of which are disposed in a substantial vertical position. The drying chambers 16 and 18 are identical in construction and are adapted to be used interchangeably for the drying of a fluid such as a gaseous medium. As illustrated in FIG. 4, the drying chamber 18 is shown in section and is defined by an elongated cylindrical tubular member or shell 20 in which a plurality of tubes 22 are positioned. The tubes 22 extend substantially the length of the cylindrical shell 20 and are secured in openings formed in opposed flanges 24 and 26, the flanges 24, 26 being adapted to locate the tubes 22 in spaced relation as illustrated in FIG. 6. An upper dome 28 is secured to the flange 24 and has a neck assembly 30 joined thereto into which a pipe 32 is threadably engaged. Joined to the lower flange 26 is a lower dome member 34 formed with a neck in which a pipe 36 is threadably engaged. Located within the shell 20 in spaced relation through out the length thereof are a plurality of spacer discs 38, each of which is formed with openings 40 corresponding to the openings in the flanges 24 and 26 for receiving the tubes 22 therein. The spacer discs 38 are tacked to the tubes 22 in some convenient manner, and each of the spacer discs is formed with a flat edge 42 that when located in alternate relation with respect to the next adjacent spacer disc provide for the continuous flow of a heated gas through the drying chamber as will be described. As shown in FIG. 4, the flat edges 42 of each spacer disc are angularly spaced 180° with respect to the next adjacent spacer disc 38 wherein a gas that is preheated and enters an inlet pipe 44 follows an undulating path around the flat edges 42 of each spacer disc and thus heats the surfaces of the tubes 22 before discharrging through an outlet pipe 46 located at the uppermost end of the drying chamber.

Each of the tubes 22 is filled with desiccant type of drying agent for removing moisture from the gaseous medium that passes therethrough, the drying agent in the present form being illustrated as a plurality of pellets 48 that are located in a packed bed in each tube. It is understood that the tubes 22 are open at the ends thereof for permitting the free flow of air therethrough, and a perforated plate 50 may be secured to the ends of each tube containing the desiccant. A wire mesh screen 52 and a flattened expanded screen 54 are located within the dome 34 and in contact with the outer edges of the tubes 22 and are adapted to retain the desiccant pellets within their tubes.

As indicated above, the drying chambers 16 and 18 are adapted to be used interchangeably in the drying process, and as will be described, the drying chamber that is not being employed in the drying process is being simultaneously regenerated or reactivated. As shown in the drawings, the drying chamber 16 is being utilized for drying the gas passing therethrough, while the drying chamber 18 is being regenerated. An inlet pipe 56 connected to a suitable source of supply of the gaseous medium to be processed communicates with a four-way valve 58 that is adapted to direct wet gas into either the drying chamber 16 or the drying chamber 18 through pipes 60 or 62, respectively. The dried gas is withdrawn from the drying chamber 16 through an outlet pipe 64 and passes through a strainer 66 and an outlet check valve 68 for discharge through a discharge pipe 70. The drying chamber 18 includes similar structure at the lower end thereof, but during the regeneration thereof the flow of gas therethrough is the opposite as when being employed during the drying operation. Thus as indicated in FIG. 1 a strainer 72 is provided for the drying chamber 18 together with a check valve 74 that communicates with the discharge pipe 70.

During the drying process, the present invention utilizes an auxiliary source of gas such as ambient air that is passed through the shell 20 into contact with the surfaces of the tubes 22 thereby cooling the tubes and increasing the moisture removing action of the drying agent located within the tubes 22.

Since water evolves heat during its adsorption, the flow of the ambient air that is passed through the shell 20 of the drying chamber 16 during the moisture removing cycle, maintains nearly isothermal conditions therein. In order to introduce the ambient air into the shell of the cylinder 16, a four-way valve 76 is provided that has communication with the atmosphere and is connected to pipes 78 and 80 that in turn are connected to the inlet pipes 44 of their respective drying chambers. A pump or blower 82 connected by a pipe 84 to a four-way valve 86 is adapted to communicate with either the drying chambers 16 or 18 through their respective outlet pipes 46. As shown in the drawings, the four-way valve 86 is illustrated in communication with the blower 82 and the drying chamber 16 since it is this drying chamber that is currently performing the moisture removing operation. It is understood that the operation of the blower 82 produces a sufficient vacuum in the piping connected to the input side thereof to draw in the ambient air through the four-way valve 76.

During the regeneration or reactivation of the drying chamber 18, flow therethrough is directed in an upward direction, and in order to purge or withdraw the moisture from the drying agent or desiccant accumulated therein during the drying operation, a portion of the dried gas withdrawn from the drying chamber 16 is heated and then directed into the drying chamber 18. As shown in FIG. 3, a tubular coil 88 that is wrapped around a heating chamber 90 communicates with the strainer 66 at one end thereof and with the strainer 72 at the other end thereof. A needle valve 92 is interposed in the coil 88 and controls the flow of gas therethrough into the drying chamber 18 that is being regenerated. The dried gas that is diverted through the coil 88 is then introduced into the dome 34 of the drying chamber 18 by way of the inlet pipe 36 and is directed through the tubes 22 into contact with the desiccant pellets located therein. The diverted dried purge gas is heated by the heating chamber 90 in the coil 88 to approximately 300 to 400° F., and as it passes through the tube it picks up the dissorbed moisture, leaving the drying chamber 18 through the outlet pipe 32 and being directed to a solenoid valve 94 through a pipe 62 and the four-way valve 58. As will be described, the solenoid controlling the solenoid valve 94 is electrically controlled such that the valve is open during the regenerating cycle of the drying chambers.

In addition to the dried gas being diverted into the drying chamber 18 for purging the desiccant thereon, the ambient air withdrawn from the drying chamber 16, is adapted to be heated and passed through the shell 20 of the drying chamber 18 for heating the tubes 22 therein. As shown in FIG. 3, a pipe 96 is connected to the outlet of the blower 82 and also communicates with the interior of the heating chamber 90. A pipe 98 connected to the opposite side of the heating chamber 90 directs the air introduced into the heating chamber through the four-way valve 76 for introduction into the shell 20 of the drying chamber 18 by way of the pipe 80 and inlet pipe 44. It is pointed out that the ambient air is initially heated during passage through the drying chamber 16 as heat is given off in the adsorption process. The ambient air is then further heated by the heat of compression of the blower 82 and is finally heated to the required temperature by the heater 90 prior to introduction into the shell of the chamber 18.

The processing cycle wherein the drying chamber is adapted to adsorb the moisture from the air being processed requires a period of approximately four hours. During this cycle the drying chamber that is not processing the wet gas is being regenerated. The operation of the drying apparatus is automatic in that the drying chambers are reversed in the manner of use, and after the four-hour period, the drying chamber being used for removing the moisture from the processed gas is then regenerated, and the regenerated drying chamber is placed in operation for processing the wet gas. In order to accomplish the automatic interchanging of the drying chambers, the four-way valves 58, 76 and 86 are interconnected by a linkage system that is operated by a control device that is, in turn, electrically controlled to operate in a predetermined sequence in time relation. As shown in FIG. 1, a main link 100 is joined to the valves 58, 86 and 76 by their respective levers 102, 104, and 106. An air cylinder 108 has a piston located thereon to which a piston rod 110 is connected, the piston rod 110 being connected to the main link 100 through a cross link 112. The air cylinder 108 is adapted to be automatically operated in timed relation, and has air lines 112 and 114 connected to opposite ends thereof for communication with both sides of the piston therein.

Flow regulators 116, 118 are connected in the lines 112, 114 respectively and a solenoid operated four-way valve 120 communicates with the air lines 112, 114 and an air line 122 connected to a source of compressed air or other operating fluid. As shown in FIG. 3, an air lubricator is connected in the air line 122 and is interposed between the source of the operating air and to the four-way valve 120.

The solenoid operated valve 120 is operated in predetermined timed sequence to admit the operating air into either air line 112 or 114 depending upon what drying chamber is to be used as the processing chamber. Upon actuation of the piston in the air cylinder 108 the piston rod 110 will be moved to cause the main link 100 to shift the four-way valves 58, 86 and 76 to reverse the positions of the drying cylinders 16 and 18.

During the four hour adsorbing cycle of the drying chamber that is processing the wet air, the regeneration cycle is divided into a two hour period and a two hour cooling period, the heating period being utilized to heat the desiccant for removal of the moisture therefrom and the cooling cycle being utilized to cool the purged desiccant. For this purpose, the heating chamber 90 is connected together with the solenoid valve 94 to a suitable timer and an arrangement of switches and relays so that at predetermined intervals, the heating chamber will be deenergized and energized to provide for the heating and cooling cycles. As mentioned hereinabove, the solenoid valve 94 is adapted to be actuated so that the operating solenoid therefor is energized so as to open the valve during the heating cycle.

In operation of the drying apparatus, it will be assumed that the drying chamber 16 will be effecting adsorption of moisture from the gas being dried and that the drying chamber 18 will be undergoing reactivation, that is, having the moisture adsorbed by the desiccant pellets being driven off by heat and purge gas. Referring now to FIG. 7, the drying apparatus is illustrated schematically and as shown, the drying chamber 16 is undergoing the four-hour adsorption cycle while the drying chamber 18 is undergoing regeneration. The wet gas to be dried enters the drying chamber 16 through the four-way valve 58, the moist air passing through the drying tubes 22 in the drying chamber 16 and leaving the chamber 16 through the pipe 64 at a dew point of approximately 100° F. Since water evolves heat during its adsorption, it is desirable to obtain nearly isothermal conditions, and for this purpose a flow of ambient air is passed through the shell 20 of the drying chamber 16 by way of the four-way valve 76 and pipe 78. The ambient air is withdrawn from the shell 20 of the drying chamber 16 by the blower 82 through the four-way valve 86 and the pipe 46 interconnected to the upper side of the drying chamber 16. The air withdrawn by the blower 82 from the drying chamber 16 is passed through the heating chamber 90 for use in the regeneration of the drying chamber 18.

The dry gas which leaves the drying chamber 60 at −100° F. dew point passes through the pipe 64 and the check valve 68 for withdrawal through the pipe 70 for use in its intended application. A portion of the dried gas is diverted from the discharge pipe 64 through the heating coil 88 and circulates around the heating chamber 90 for passage through the needle valve 92 and into the lower end of the drying chamber 18. The needle valve 92 controls the amount of dried air that is diverted to the drying chamber 18, this amount of dried air being utilized to purge the desiccant pellets located in the tubes 22 of the drying chamber. Before entering the saturated beds of desiccant pellets, the purge air, which is passed through the heating coil 88, is raised to a temperature of approximately 300 to 400° F., so that when it passes through the tubes in the drying chamber 18 it picks up the dissorbed moisture therein. The purge air leaves the drying chamber 18 through the pipe 62, the four-way valve 58 and the solenoid valve 94, which is open during the heating cycle of the regeneration period.

As described above, the ambient air that is utilized to maintain near isothermal conditions in the drying chamber 16 during adsorption, passes through the drying chamber 16, through the blower 82 and into the heating chamber 90. The air passing into the heating chamber 90 from the blower 82 is heated to approximately 600° F. and is then directed into the shell 20 of the drying chamber 18 for supplying the heat necessary to efficiently heat the tubes during regeneration of the desiccant therein. This air leaves the drying chamber 18 through the discharge pipe 46 at the upper end thereof which is interconnected to the four-way valve 86.

In regenerating the chamber 18, the tubes 22 cooperate with the shell 20 to produce a system that more quickly and efficiently effect the regeneration of the desiccant located in the tubes. By utilizing the tube design, the purge gas and heating gas are completely isolated. The heating gas may thus be efficiently heated to the desired temperatures without regard to the effect on the contact thereof with the desiccant. Furthermore, the quality of the heating gas is not critical since the heating gas is always isolated from the desiccant and the purge gas. By utilizing individual tubes, the cooling period required is considerably reduced over that experienced heretofore, since large masses of the desiccant are avoided. Heretofore a considerable period of the regenerating cycle was devoted to cooling the large mass of desiccant. However, in the present invention, since the desiccant is arranged in a plurality of spaced tubes in relatively small quantities, the cooling period of the desiccant is relatively short. The use of the relatively small diameter tubes further provides for introducing the wet gas into the system at relatively high pressures.

It is understood that after the four-hour processing cycle, the drying agent in the tubes 22 of the drying chamber 16 will be sufficiently saturated so that further processing of the wet gas by the drying chamber 16 will be impractical. Since the timers and automatic equipment are set so as to reverse the position of operation of the drying chambers 16 and 18, after the four-hour interval, the air cylinder 108 will be operated to actuate the main link 100, thereby rotating the respective levers of the four-way valves 58, 86 and 76. Movement of the four-way valves as indicated will then reverse the direction of flow of the gas being processed so that the drying chamber 18 will then receive the wet gas, and the drying chamber 16 will then be regenerated. The needle valve 92 may be preset and will not have to be reset for each processing operation. The check valves 68 and 74 are of the swing or one-way type and may therefore be operated unattended. A relief valve indicated at 124 may also be provided for relieving the pressure in the pipe 70 if necessary. The two-hour heating cycle and the two-hour cooling cycle during regeneration of the drying chambers are automatically controlled by timing the heating of the chamber 90 and opening of the solenoid valve 94.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. In apparatus for removing moisture from a fluid, at least two processing chambers that are utilized alternately for removing the moisture from said fluid, said chambers being of similar construction and located in adjacent vertical relation, the chamber not being utilized for processing said fluid being simultaneously regenerated during the fluid processing operation, said chambers having a plurality of open-ended tubes located therein in spaced relation, means for directing said fluid in a continuous flow downwardly through the tubes in the chamber that is used for fluid processing during the fluid processing operation, a drying agent located in said tubes for adsorbing moisture from said fluid as it passes downwardly through said tubes during the processing operation, means for introducing ambient air into the chamber that is processing said fluid for maintaining the processing chamber under near isothermal conditions, said ambient air being directed upwardly through the processing chamber in opposite flow to said fluid, means for diverting a portion of the dried processed fluid upwardly through the tubes in the chamber that is being regenerated for reactivating said drying agent therein, means for withdrawing said ambient air from said processing chamber, means for heating said ambient air, means for directing the heated ambient air upwardly through the chamber being regenerated but out of contact with the diverted dried processed fluid, and means for interchanging said chambers in the operation thereof so that the chamber removing moisture from the fluid will be regenerated and the chamber that has been regenerated will be utilized as the processing chamber.

2. In a method of removing moisture from an operating fluid comprising the steps of passing the fluid to be processed downwardly in a drying chamber through a series of tubes having a drying agent therein, cooling the exterior of said tubes by passing air into contact therewith thereby increasing the drying action of said drying agent, simultaneously regenerating a similar drying chamber during the processing of said fluid by diverting a portion of the dried fluid through a heater for raising the temperature thereof and then passing the heated processed air through the tubes of the drying chamber being reactivated for removing the moisture from the drying agent, withdrawing said ambient gas from the processing chamber, raising the temperature of the withdrawn ambient air, and heating the exterior of said tubes during the regeneration cycle by passing the heated ambient air through the shell of the chamber being regenerated and out of contact with the diverted dried fluid, the isolated streams of heated air and dried fluid cooperating to reduce the period of the regenerating cycle.

3. In a method of drying a gaseous medium, comprising the steps of passing the gaseous medium to be dried through a first drying chamber in which a plurality of tubes having a drying agent therein are located, cooling the interior of said first drying chamber by passing a gas stream through said first drying chamber but out of contact with said gaseous medium, withdrawing the dried gaseous medium from said first drying chamber and directing it to a point of discharge, diverting a portion of the dried gaseous medium, heating said diverted portion and then directing the heated diverted portion of said gaseous medium through the tubes of a second drying chamber that is adapted to be regenerated for reactivating the drying agent therein, withdrawing said gas stream from said first drying chamber, increasing the temperature of the withdrawing gaseous stream, and directing the heated gas stream into the chamber being regenerated into contact with the exterior surfaces of the tubes therein, said heated gas stream cooperating with said diverted portion of the dried gaseous medium to effectively regenerate said second drying chamber.

4. In a method of drying a gaseous medium as set forth in claim 2, reversing the flow of gaseous medium to be dried from the first drying chamber to said second drying chamber, and reversing the flow of the heated gas stream from said second drying chamber to said first drying chamber wherein said second drying chamber processes said gaseous medium for the drying thereof and said first drying chamber is regenerated.

5. In apparatus for removing moisture from a gas, a first drying chamber through which the wet gas is passed for the removal of moisture therefrom, a second drying chamber used interchangeably with said first drying chamber and adapted to be regenerated simultaneously with the drying of the gas by said first drying chamber, means for diverting a portion of said dried gas into said second drying chamber during the regeneration cycle, means for heating said diverted dried gas, means for introducing ambient air into said first drying chamber for maintaining near isothermal conditions therein during the moisture removing cycle, means for withdrawing said ambient air from said first drying chamber, means for increasing the temperature of the withdrawn ambient air, means for circulating the heated ambient air in said second drying chamber but out of contact with said diverted gas stream, and means for reversing the direction of flow of the gas being dried and the dried gas used for regeneration, wherein said second drying chamber is utilized for removing moisture from the wet gas and said first drying chamber is adapted to be regenerated.

6. In apparatus for drying a gaseous medium, at least one chamber for processing said gaseous medium therethrough, at least one chamber of similar construction to said first chamber and utilized alternately therewith for processing said gaseous medium therethrough, each chamber being simultaneously regenerated when the other is processing said gaseous medium therethrough, both said chambers being located such that the longitudinal axes thereof are vertical and having a plurality of tubular members positioned in spaced relation therein, said tubular members being open at the ends thereof to provide a continuous flow path therethrough, ports located at opposite ends of said chambers and communicating with said open-ended tubes therein, wherein the gaseous medium introduced at one end of said chambers will pass through said tubular members and will be discharged through the other end of said chambers, a desiccant material located in said tubular members for adsorbing the moisture in said gaseous medium as it is passed therethrough, means for passing ambient air through the chamber that is processing the gaseous medium and into contact with the exterior of said tubular members therein for maintaining the processing chamber under isothermal conditions, means for diverting a portion of the dried gaseous medium through the tubular members in the chamber that is being regenerated for reactivating the saturated desiccant therein, means for withdrawing said ambient air from said processing chamber, means for heating said withdrawn ambient air, means for introducing the heated ambient air into the chamber that is being regenerated for aiding in the desorption of moisture from the desiccant material therein, and means for automatically interchanging said chambers in the use thereof so that the chamber for drying the gaseous medium is regenerated and the chamber that has been regenerated is utilized for adsorbing the moisture from the gaseous medium being processed.

7. In apparatus for drying an operating medium, at least one chamber for processing said operating medium therethrough, at least one chamber of similar construction to said first chamber and being utilized alternately therewith for processing said operating medium therethrough and being simultaneously regenerated during the processing cycle of the other chamber, said chambers each having a plurality of tubular members positioned therein in which a drying agent is located, means for reversing the flow path of the operating medium so that it passes through the regenerated chamber when the drying agent in the processing chamber becomes saturated, means for introducing a gaseous medium into said processing chamber for cooling the tubular members during the processing operation for maintaining near isothermal conditions in the processing chamber, means for passing a diverted portion of the dried operating medium through the tubes of the chamber being regenerated, means for withdrawing said gaseous medium from said processing chamber, means for heating said withdrawn gaseous medium, and means for passing the heated gaseous medium through the chamber being regenerated but out of contact with the operating medium, wherein the operating medium and heated gas cooperate to effectively reactivate the drying agent in the chamber being regenerated.

8. In a method of drying a gaseous medium in which at least two vertically disposed drying chambers alternately prcess the gaseous medium therethrough and are regenerated in predetermined cycles comprising the steps of continuously passing the gaseous medium to be dried downwardly through one of said drying chambers for the removal of moisture therefrom, withdrawing the dried gaseous medium from said one drying chamber and directing it to a point of discharge, continuously diverting a portion of the dried gaseous medium to the lower end of the other of said drying chambers that is to be regenerated for purging said other chamber, continuously passing the diverted purging gaseous medium upwardly through said other drying chamber during the regeneration cycle of said other drying chamber, and passing ambient air through said one drying chamber that is processing the gaseous medium but out of contact with said gaseous medium for maintaining near isothermal conditions in said one drying chamber, withdrawing said ambient air from said one drying chamber and preheating it prior to the introduction thereof in said other drying chamber being regenerated, and passing said heated ambient air upwardly through said other drying chamber but out of contact with said diverted purging gaseous medium that also passes upwardly therethrough during the regeneration cycle.

References Cited in the file of this patent

UNITED STATES PATENTS

| | | |
|---|---|---|
| 1,948,779 | Abbott et al. | Feb. 27, 1934 |
| 2,616,515 | Berg | Nov. 4, 1952 |
| 2,747,681 | Schuftan et al. | May 29, 1956 |
| 2,815,089 | Turner | Dec. 3, 1957 |